(12) United States Patent
Baleine et al.

(10) Patent No.: US 9,969,647 B2
(45) Date of Patent: May 15, 2018

(54) GLASS COMPOSITES HAVING A GRADIENT INDEX OF REFRACTION AND METHODS FOR PRODUCTION THEREOF

(71) Applicants: LOCKHEED MARTIN CORPORATION, Bethesda, MD (US); University of Central Florida Research Foundation, Inc., Orlando, FL (US)

(72) Inventors: Clara Rivero Baleine, Orlando, FL (US); Kathleen Richardson, Geneva, FL (US); Charmayne Smith, Winter Park, FL (US)

(73) Assignees: LOCKHEED MARTIN ENERGY, LLC, Bethesda, MD (US); UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 36 days.

(21) Appl. No.: 15/157,223

(22) Filed: May 17, 2016

(65) Prior Publication Data
US 2017/0334768 A1    Nov. 23, 2017

(51) Int. Cl.
| | |
|---|---|
| *C03C 10/16* | (2006.01) |
| *C03C 3/32* | (2006.01) |
| *C03C 23/00* | (2006.01) |
| *G02B 3/00* | (2006.01) |
| *G02B 1/00* | (2006.01) |

(52) U.S. Cl.
CPC ........... *C03C 10/16* (2013.01); *C03C 3/32* (2013.01); *C03C 3/321* (2013.01); *C03C 3/323* (2013.01); *C03C 23/0025* (2013.01); *G02B 1/00* (2013.01); *G02B 3/0087* (2013.01); *C03C 2204/00* (2013.01)

(58) Field of Classification Search
CPC ............ C03C 3/32; C03C 3/321; C03C 3/323
See application file for complete search history.

(56) References Cited

U.S. PATENT DOCUMENTS

| | | |
|---|---|---|
| 3,362,797 A | 1/1968 | Shaskolskaja et al. |
| 3,825,317 A | 7/1974 | Inoue et al. |
| 4,209,229 A | 6/1980 | Rittler |
| 4,635,082 A | 1/1987 | Domoto et al. |
| 4,867,544 A | 9/1989 | Bornstein et al. |
| 5,102,694 A | 4/1992 | Taylor et al. |
| 5,166,827 A | 11/1992 | Noda |
| 5,171,344 A | 12/1992 | Noda |
| 5,200,858 A | 4/1993 | Hagerty et al. |
| 5,236,486 A | 8/1993 | Blankenbecler et al. |
| 5,245,328 A | 9/1993 | Garrett |
| 5,254,454 A | 10/1993 | Mimiya et al. |
| 5,262,896 A | 11/1993 | Blankenbecler |
| 5,294,240 A | 3/1994 | Sanghera et al. |
| 5,336,643 A | 8/1994 | Goto et al. |
| 5,349,473 A | 9/1994 | Kurasawa et al. |
| 5,448,409 A | 9/1995 | Noda |
| 5,459,613 A | 10/1995 | Xu |
| 5,537,505 A | 7/1996 | Borrelli et al. |
| 5,608,568 A | 3/1997 | Blodgett et al. |
| 5,731,906 A | 3/1998 | Morita |
| 5,796,525 A | 8/1998 | Dempewolf et al. |
| 5,867,264 A | 2/1999 | Hinnrichs |
| 5,917,105 A | 6/1999 | Xu et al. |
| 6,027,672 A | 2/2000 | Weitzel et al. |
| 6,236,493 B1 | 5/2001 | Schmidt et al. |
| 6,362,118 B1 | 3/2002 | Beall et al. |
| 6,519,975 B1 | 2/2003 | Bange et al. |
| 6,570,784 B2 | 5/2003 | Lowrey |
| 6,586,474 B2 | 7/2003 | Webber et al. |
| 6,586,761 B2 | 7/2003 | Lowrey |
| 6,673,497 B2 | 1/2004 | Efimov et al. |
| 6,687,153 B2 | 2/2004 | Lowrey |
| 6,760,526 B2 | 7/2004 | Ellison et al. |
| 6,819,469 B1 | 11/2004 | Koba |

(Continued)

FOREIGN PATENT DOCUMENTS

JP    S-63-222041    9/1988

OTHER PUBLICATIONS

Jared, David A. et al., "Electrically addressed spatial light modulator that uses a dynamic memory," Optics Letters, vol. 16, No. 22, Nov. 15, 1991, Optical Society of America, pp. 1785-1787.

Jiang, Lijun et al., "Design, fabrication and testing of a micromachined thermo-optical light modulator based on a vanadium dioxide array," Journal of Micromechanics and Microengineering, vol. 14, No. 7, May 13, 2004, IOP Publishing Ltd., pp. 833-840.

Siegel, J. et al., "Rewritable phase-change optical recording in $Ge_2Sb_2Te_5$ films induced by picosecond laser pulses," Applied Physics Letters, vol. 84, Issue 13, Mar. 29, 2004, American Institute of Physics, 4 pages.

Verleur, Hans W. et al., "Optical Properties of $VO_2$ Between 0.25 and 5 eV," Physical Review, vol. 172, No. 3, Aug. 15, 1968, pp. 788-798.

(Continued)

*Primary Examiner* — Elizabeth A. Bolden
(74) *Attorney, Agent, or Firm* — McDermott Will & Emery LLP

(57) ABSTRACT

Gradient refractive index (GRIN) materials can include multi-phase composites having substances with differing refractive indices disposed non-uniformly within one another. Particular glass composites having a gradient index of refraction can include: an amorphous phase, and a phase-separated region disposed non-uniformly within the amorphous phase. The glass composites include a mixture containing: $GeZ_2$ and $A_2Z_3$ in a combined molar ratio of about 60% to about 95%, and CsX and PbZ in a combined molar ratio of about 5% to about 40%, where A is As, Sb or Ga, X is Cl, Br or I, and Z is S or Se. When A is As, the glass composites include PbZ in a molar ratio of about 15% or less. The amorphous phase and the phase-separated region have refractive indices that differ from one another. More particularly, A is Ga or As, X is Cl, and Z is Se.

24 Claims, 8 Drawing Sheets

(56) References Cited

U.S. PATENT DOCUMENTS

| | | |
|---|---|---|
| 6,908,812 B2 | 6/2005 | Lowrey |
| 6,959,753 B1 | 11/2005 | Weber et al. |
| 7,005,665 B2 | 2/2006 | Furkay et al. |
| 7,119,353 B2 | 10/2006 | Lankhorst et al. |
| 7,148,164 B2 | 12/2006 | Minamikawa et al. |
| 7,164,818 B2 | 1/2007 | Bryan et al. |
| 7,173,767 B2 | 2/2007 | Satzke |
| 7,208,133 B2 | 4/2007 | Cho et al. |
| 7,315,683 B2 | 1/2008 | Beall et al. |
| 7,326,500 B1 | 2/2008 | Glebov et al. |
| 7,405,883 B2 | 7/2008 | Hashimoto |
| 7,501,648 B2 | 3/2009 | Chen et al. |
| 7,570,432 B1 | 8/2009 | Yonak |
| 7,687,871 B2 | 3/2010 | Maimon |
| 7,800,095 B2 | 9/2010 | An et al. |
| 7,880,194 B2 | 2/2011 | Breitwisch et al. |
| 8,120,770 B2 | 2/2012 | Huang et al. |
| 8,178,387 B2 | 5/2012 | Cheng et al. |
| 8,306,786 B1 | 11/2012 | Lynch et al. |
| 9,293,197 B2 | 3/2016 | Baleine et al. |
| 9,340,446 B1 | 5/2016 | Baleine et al. |
| 2002/0022564 A1 | 2/2002 | Minamikawa et al. |
| 2002/0088952 A1 | 7/2002 | Rao et al. |
| 2004/0114204 A1 | 6/2004 | Klug et al. |
| 2005/0030784 A1 | 2/2005 | Johnson |
| 2005/0032623 A1 | 2/2005 | Araujo et al. |
| 2005/0137075 A1 | 6/2005 | Messerschmidt et al. |
| 2006/0051047 A1 | 3/2006 | Beall et al. |
| 2006/0068154 A1 | 3/2006 | Parce et al. |
| 2006/0097342 A1 | 5/2006 | Parkinson |
| 2006/0135341 A1 | 6/2006 | Ellison et al. |
| 2007/0045771 A1 | 3/2007 | Philipp et al. |
| 2007/0079750 A1 | 4/2007 | Miguez et al. |
| 2007/0093373 A1 | 4/2007 | Borrelli et al. |
| 2007/0116409 A1 | 5/2007 | Bryan et al. |
| 2007/0181867 A1 | 8/2007 | Hewak et al. |
| 2007/0202319 A1 | 8/2007 | Bryan et al. |
| 2009/0236079 A1 | 9/2009 | Khodadadi |
| 2011/0013287 A1 | 1/2011 | Huang et al. |
| 2011/0266445 A1 | 11/2011 | Beratan |
| 2011/0293942 A1 | 12/2011 | Cornejo et al. |
| 2012/0127562 A1 | 5/2012 | Kim et al. |
| 2012/0213270 A1 | 8/2012 | Baraniuk et al. |
| 2013/0043375 A1 | 2/2013 | Baleine et al. |
| 2014/0378818 A1 | 12/2014 | Drake et al. |
| 2015/0177426 A1 | 6/2015 | Sakoske et al. |
| 2016/0088242 A1 | 3/2016 | Baleine et al. |

OTHER PUBLICATIONS

Non-Final Office Action dated Feb. 9, 2015, from U.S. Appl. No. 13/585,577.

Final Office Action dated May 26, 2015, from U.S. Appl. No. 13/585,577.

Notice of Allowance dated Aug. 20, 2015, from U.S. Appl. No. 13/585,577.

Non-Final Office Action dated Jul. 28, 2015, from U.S. Appl. No. 14/172,175.

Notice of Allowance dated Jan. 15, 2016, from U.S. Appl. No. 14/172,175.

Non-Final Office Action dated Jul. 29, 2016, from U.S. Appl. No. 14/518,106.

Richardson et al., "Engineering Novel Infrared Glass Ceramics for Advanced Optical Solutions," SPIE 9822, Advanced Optics for Defense Applications: UV through LWIR, 9822-4, Apr. 17, 2016, retrieved from http://www.creol.ucf.edu/Research/Publications/10758.pdf, 24 pages.

Guo et al., "Near- and mid-infrared emissions of Dy3+ doped and Dy3+/Tm3+ co-doped lead cesium iodide modified chalcohalide glasses," Journal of Luminescence, 2014, vol. 148, p. 10-17.

Hubert, "Chalcogenide Glasses," for Infrared Applications: New Synthesis Routes and Rare Earth Doping," Dissertation University of Arizona, 2012, retrieved from http://arizona.openrepository.com/arizona/handle/10150/223357, pp. 19-24, 60-62, 77-80.

Yang et al., "Glass Formation and Properties of Chalcogenides in a GeSe2—As2—Se3—PbSe System," Journal of the American Ceramic Society, May 2007, vol. 90, No. 5, pp. 1500-1503.

International Search Report and Written Opinion from PCT/US2017/28185, dated Jul. 19, 2017, 8 pages.

GLASS COMPOSITES HAVING A GRADIENT INDEX OF REFRACTION AND METHODS FOR PRODUCTION THEREOF

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to optical materials and, more specifically, to optical materials displaying a gradient index of refraction.

BACKGROUND

In traditional optical devices, imaging systems often utilize multiple lenses to form high quality images with low aberrations. In addition to the time and expense of fabricating multiple lenses, there is a corresponding increase in system volume and weight. In addition, the increased system volume can lead to problematic layout challenges in many instances. Although multi-lens approaches can be successful for many applications, there are a number of other instances where a multi-lens approach is either sub-optimal or not feasible at all.

Traditional lenses utilize optical materials with a constant index of refraction. The constant index of refraction necessitates that a given lens have a particular size and shape in order to bend (refract) electromagnetic radiation in a desired manner as the electromagnetic radiation passes through the lens. As indicated above, this requirement can represent a significant cost and design issue, particularly for multi-lens optical systems. In addition, the convex or concave shape of traditional lenses can be problematic to incorporate into the architecture of some optical systems. For example, the shape of convex and concave lenses can preclude stable placement of such lenses on a flat surface.

Compared to traditional lenses having a constant index of refraction, lenses fabricated from a material having a gradient index (GRIN) of refraction can provide a number of advantages. Such materials will be referred to herein as "GRIN materials." Lenses containing a GRIN material can bend electromagnetic radiation differentially depending upon the particular region of the lens through which the electromagnetic radiation travels. Because bending of the electromagnetic radiation is no longer limited by the constant index of refraction of a single material, lenses containing a GRIN material can be fabricated in simpler geometries that can facilitate their disposition in various optical systems. For example, GRIN-based lenses can have a flat surface in certain extreme cases, or can replace a more expensive aspheric lens (e.g., with a simpler spherical lens made of a GRIN material). Moreover, GRIN-based lenses can allow fewer lenses or even one lens to accomplish a similar optical transformation to that provided in comparable multi-lens systems employing traditional lens materials. Hence, GRIN-based lenses can provide significant opportunities for reduction of the size and complexity of various optical systems.

Despite the desirability of GRIN materials, relatively few are known, and they can sometimes be difficult to fabricate. One process for preparing GRIN materials involves ion-exchange modification of a base oxide glass matrix, typically resulting in radial gradient index of refraction in the direction of the ion exchange. Other illustrative processes for producing GRIN materials involve stacking and/or laminating thin layers of various glasses or polymers having differing indices of refraction to form a material having a refractive index that varies throughout the material's thickness, thereby resulting in an axial gradient index of refraction in the stacked elements. Post-production doping of a low-index material with a high-index material, such as through inkjet printing techniques or other liquid-like mixing processes of two or more materials, can also be used to produce a GRIN material.

GRIN materials produced in the foregoing manners and others can have a number of drawbacks. Many of the foregoing fabrication processes are operationally complex, time-consuming, and expensive. When using conventional fabrication processes, it can also be difficult to vary the refractive index satisfactorily across the surface of a lens or in multiple dimensions. Additionally, the magnitude of the refractive index gradient is usually small, and laminated GRIN materials can be subject to delamination under certain environmental or use conditions. From a technological standpoint, conventionally produced GRIN materials can often display a limited transmission window, sometimes due to the spectral properties of the matrix material, particularly throughout the infrared or visible absorption regions of the electromagnetic spectrum. Scattering of electromagnetic radiation can also be problematic in conventionally produced GRIN materials. These factors can limit the breadth of applications where conventional GRIN materials can be satisfactorily used, particularly in systems that transmit multiple wavelengths across specific ranges of electromagnetic radiation, for example. Electromagnetic radiation transparency with limited scatter in a broad wavelength range of 1 to 12 microns can be of particular interest for infrared laser systems, for example. The lack of broadband transparency can limit the applicability of many GRIN materials in various instances.

In view of the foregoing, GRIN materials having a wide transmission window that can be produced by readily available fabrication techniques would be of considerable interest in the art. The present disclosure satisfies the foregoing need and provides related advantages as well.

SUMMARY

In various embodiments, the present disclosure provides glass composites having a gradient index of refraction. The glass composites include an amorphous phase, and a phase-separated region disposed non-uniformly within the amorphous phase. The glass composite contains a mixture including $GeZ_2$ and $A_2Z_3$ in a combined molar ratio of about 60% to about 95%, and CsX and PbZ in a combined molar ratio of about 5% to about 40%. A is As, Sb or Ga, X is Cl, Br or I, and Z is S or Se. The amorphous phase has a first index of refraction, and the phase-separated region has a second index of refraction, where the first index of refraction differs from the second index of refraction. The glass composites include PbZ in a molar ratio of about 15% or less when A is As.

In other various embodiments, the present disclosure provides methods for making a gradient refractive index material. The methods include providing a mixture containing $GeZ_2$ and $A_2Z_3$ in a combined molar ratio of about 60% to about 95%, and CsX and PbZ in a combined molar ratio of about 5% to about 40%; heating the mixture to form a melt; cooling the melt below a glass transition temperature thereof to form an intermediate amorphous material; and locally heating the intermediate amorphous material to define a phase-separated region within an amorphous phase. A is As, Sb or Ga, X is Cl, Br or I, and Z is S or Se. The mixture includes PbZ in a molar ratio of about 15% or less when A is As. The phase-separated region is disposed non-uniformly within the amorphous phase. The amorphous phase has a first index of refraction, and the phase-separated region has a second index of refraction, where the first index of refraction differs from the second index of refraction.

In still other various embodiments, the present disclosure provides optical structures having a transmission window of at least about 1 micron to about 12 microns. The optical structures include a glass composite of the present disclosure having a gradient index of refraction.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1A:
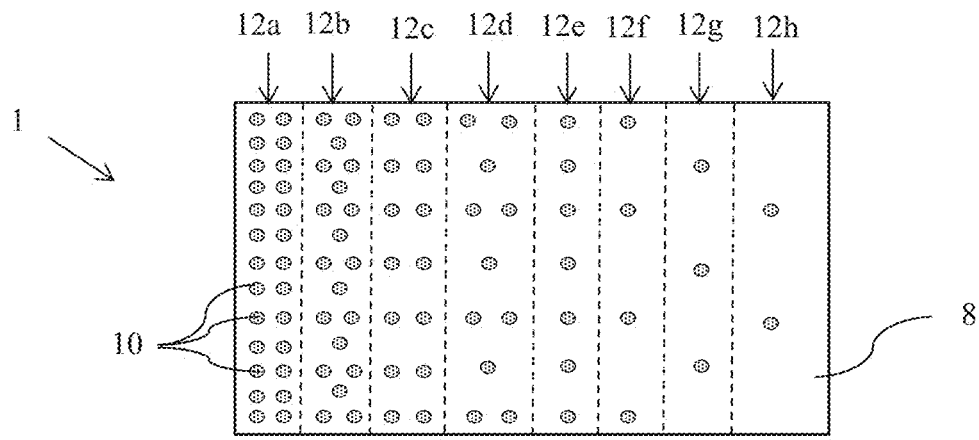
FIGS. 1A-1C show diagrams of illustrative glass composites having a non-uniform distribution of a phase-separated region within a matrix of an amorphous phase.

The present disclosure is directed, in part, to glass composites having a gradient index of refraction (GRIN materials). The present disclosure is also directed, in part, to lenses and other optical structures incorporating a GRIN material. The present disclosure is also directed, in part, to methods for producing GRIN materials.

As discussed above, GRIN materials can provide a number of advantages compared to conventional optical materials having a constant index of refraction. At the very least, GRIN materials can allow optical systems to be constructed using fewer lenses than optical systems incorporating traditional lenses fabricated from materials having a homogenous index of refraction (crystalline or glass-like), and the lens geometry can be much simpler. For example, the convex or concave structure of traditional lenses can be replaced with a flat surface in lenses incorporating a GRIN material. However, GRIN materials can sometimes be difficult to produce using currently available fabrication methods, and many conventional GRIN materials can display a limited transmission window, particularly within the visible and infrared regions of the electromagnetic spectrum. The limited transmission window can significantly limit the applicability of conventional GRIN materials in many optical systems of interest.

The present inventors discovered various glass composites having wide transmission windows in which a gradient index of refraction can be readily introduced in various homogenous or spatially specific manners. As a concurrently realized benefit, the glass composites can also display a gradient in their mechanical properties, chemical properties, thermal properties, and the like. In particular, the inventors discovered that GRIN materials in the form of glass composites can be produced by locally producing a phase-separated region within a matrix of an amorphous phase (e.g., by inducing short-range order in an otherwise amorphous substance or by producing a separate amorphous phase in certain locations), where the phase-separated region and the amorphous phase have differing indices of refraction. The inventors identified various glass blends that can be produced in amorphous form by melt processing, which can then be subjected to a further localized heating operation to form multi-phase glass composites having a gradient index of refraction. Advantageously, the inventors discovered facile and potentially high throughput techniques that can be used to induce such localized phase separation in a gradient distribution throughout the structure of the glass composites. In particular, the inventors identified that spot heating with a laser can induce localized phase separation in such glass blends to produce the corresponding multi-phase glass composites. In some instances, crystallization can occur within the phase-separated region, but this is not a requirement for producing a GRIN material.

The present inventors discovered that localized phase separation can be readily realized in some instances by including PbSe in the glass blends. This material can be readily crystallized in some instances upon localized spot heating of an amorphous glass blend with a laser. Moreover, this material can allow a broad transmission window to be maintained over the visible and infrared regions of the electromagnetic spectrum. In some embodiments, PbSe crystallites can be generated in the form of nanoparticles (i.e., particles having an equivalent spherical diameter ranging between 1 and 1000 nm, more typically in a range between about 1 nm and about 100 nm), which can be advantageous for limiting scattering of electromagnetic radiation passing through the glass composites. Even more significantly, PbSe has a very high index of refraction (n~4), which differs significantly from the indices of refraction of the typical amorphous phases in which the PbSe crystallites are disposed. Accordingly, a low concentration of the PbSe can induce a significant change in the local refractive index. The markedly differing refractive indices can be particularly advantageous for forming a GRIN material, as it is the difference in the refractive index that constitutes the ultimate gradient that is achievable. PbS presents similar advantages in regard to its high index of refraction and ready crystallization in some instances, but it offers a significantly decreased transmission window compared to PbSe, particularly at longer wavelengths.

As a further advantage, the inventors discovered that the glass composites of the present disclosure can have a broad transmission window extending from wavelengths of at least about 1 micron to about 12 microns in the electromagnetic spectrum. This wavelength range can be operationally advantageous for many optical systems, such as those employing infrared lasers. Further, the transmission window can be altered by varying the composition of the glass composites. As discussed above, transmission windows of this breadth can be very difficult to achieve with conventional GRIN materials. Although some glass blends are known to possess a wide transmission window (see Table 1 for some exemplary blends and their transmission windows), none are believed to have been discovered heretofore that possess the defining characteristics of a GRIN material. Specifically, conventional glass blends are fully amorphous and do not possess capabilities for directly having a gradient index of refraction induced therein.

TABLE 1

| Glass Composition (Product Name) | Transmission Window (microns) |
|---|---|
| ZnSe | 0.6-15+ |
| ZnS (CLEARTRAN)[1] | 0.37-13.5 |
| Ge—As—Se (AMTIR-1)[2] | 0.7-12 |
| $As_2Se_3$ (AMTIR-2)[2] | 1.0-14 |
| As—Se (AMTIR-4)[2] | 1.0-12 |
| As—Se (AMTIR-5)[2] | 1.0-12 |
| $As_2Se_3$ (IRG 26)[3] | 1.0-12.5 |

[1]Dow Chemical Company
[2]Amorphous Materials, Inc.
[3]Schott

The inventors found that by including a cesium halide, particularly CsCl or CsI, in the glass blends of the present disclosure, the effective transmission window can be broadened, while still allowing differential phase separation to occur upon subsequent processing to produce a desirably high refractive index difference. CsCl, for instance, can be especially effective at extending the transmission window at shorter wavelengths. Differential phase separation can still be maintained in the presence of CsCl even when PbSe is not present.

Hence, the glass composites described herein can be advantageous for producing various optical structures in which it can be desirable for a gradient index of refraction to be present. Lenses incorporating a GRIN material represent but one example of an optical structure that can be advantageous over those utilizing conventional materials. For example, lenses incorporating at least some of the glass composites described herein can be advantageous due to their broad transmission windows and gradient indices of refraction. Although the disclosure herein is directed to lenses in some embodiments, it is to be recognized that other types of optical structures can also benefit from the incorporation of a GRIN material therein. Illustrative optical structures that can benefit in this regard include, for example, optical fibers, optical coatings, waveguides, transformation optical components, integrated circuit optics, metamaterial optics, volume gratings, spectral filters, hybrid diffractive optical components, focal plane array optics, hybrid refractive optical components, solar collection optics, and the like.

In various embodiments, the present disclosure describes glass composites having a gradient index of refraction, where the glass composites include an amorphous phase, and a phase-separated region disposed non-uniformly within the amorphous phase. The amorphous phase has a first index of refraction, and the phase-separated region has a second index of refraction, where the first index of refraction differs from the second index of refraction. More specifically, the glass composites constitute a mixture containing $GeZ_2$ and $A_2Z_3$ (A=As, Sb or Ga, and Z=S or Se) in a combined molar ratio of about 60% to about 95%, and CsX (X=Cl, Br or I) and PbZ in a combined molar ratio of about 5% to about 40%. The glass composites include PbZ in a molar ratio of about 15% or less when A is As. The amorphous phase can constitute a matrix in which the phase-separated region is disposed. The phase-separated region can be in either amorphous or at least partially crystalline form according to the various embodiments of the present disclosure.

As used herein, the term "glass" will refer to any amorphous (i.e., at least partially non-crystalline) material that can reversibly transition from a molten state at high temperatures to a hard and relatively brittle state at low temperatures, while exhibiting a thermodynamic glass transition. Although silicate glasses are most commonly associated with the term "glass," where oxygen is a significant constituent, the term is to be construed more broadly herein in view of the foregoing definition. For example, non-oxide glasses, such as those disclosed herein, are also fully consistent with the foregoing definition of the term "glass."

As used herein, the term "glass composite" will refer to any hybrid material containing one or more admixed components within a glass matrix. In particular embodiments, glass composites of the present disclosure contain a phase-separated region having a composition differing from that of an amorphous glass matrix in which the phase-separated region is disposed. In some embodiments, the phase-separated region can have a crystalline or nanocrystalline morphology.

As used herein, the terms "index of refraction," "refractive index," and "index" will be used synonymously and will refer to the velocity of electromagnetic wave propagation in a medium relative to the speed of light in a vacuum. The refractive index, n, is defined according to Formula 1, where c is the speed of light in a vacuum and v is the velocity of the electromagnetic radiation in a given medium.

$$n = c/v \quad (1)$$

Accordingly, the slower the velocity of electromagnetic wave propagation in a given medium, the larger the refractive index becomes.

In composite materials having localized regions with differing indices of refraction, propagating electromagnetic radiation tends to bend away from regions having a low index of refraction toward regions having a higher index of refraction. Similar behavior occurs at the junction of two materials having differing indices of refraction. As used herein, the term "refraction" will refer to the bending of electromagnetic radiation, regardless of the origin of the bending. For a homogeneous composition containing multiple components, the refractive index is defined by Formula 2, wherein $n_m$ is the approximate refractive index of the mixture, $n_n$ is the refractive index of the nth component, and $x_n$ is the volume fraction of the nth component (n=1, 2, 3, 4, etc.).

$$n_m = n_1 x_1 + n_2 x_2 + \ldots \quad (2)$$

Figure 1B:
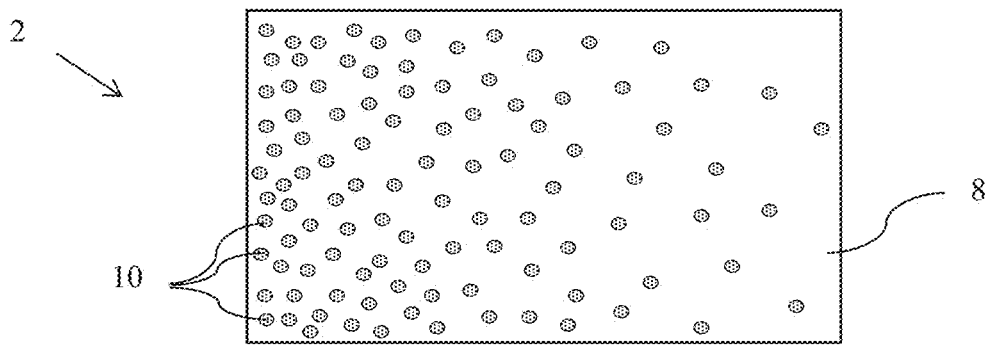
Figure 1C:
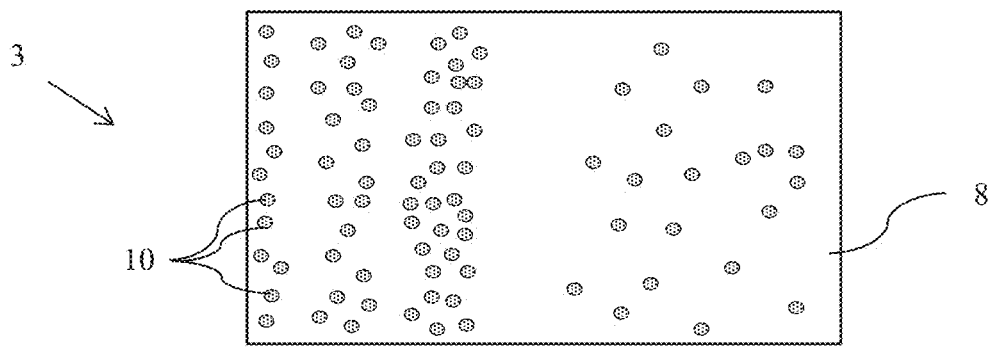

As used herein, the term "disposed non-uniformly" will be used synonymously with the term "gradient." Accordingly, glass composites having a non-uniform disposition of a phase-separated region within an amorphous (glass) phase can include those having any two- or three-dimensional spatial variation in the density of the phase separation and/or the crystallinity or nanocrystallinity of the phase separation. In some embodiments, the non-uniform distribution can be a stepped gradient. In other embodiments, the non-uniform distribution can be a continuous gradient, wherein the density of the phase separation is either continuously increasing or decreasing in a given direction. In alternative embodiments, the gradient can be random in nature, undergoing increases or decreases without periodicity. Further disclosure in regard to the foregoing is provided hereinbelow. In some embodiments, the phase-separated region can include a crystalline phase containing a plurality of crystallites as shown in FIGS. 1A-1C below. In alternative embodiments, the phase-separated region can also be non-crystalline (i.e., amorphous) in nature. Thus, although FIGS. 1A-1C show a crystalline phase-separated region, the phase separated region can also be amorphous, and/or crystalline and amorphous regions can be co-present with one another in the phase-separated region. Further, multiple compositions can also be present in the phase-separated region in some embodiments.

FIGS. 1A-1C show diagrams of illustrative glass composites having a non-uniform distribution of a phase-separated region within a matrix of an amorphous phase 8. As shown in FIG. 1A, the non-uniform distribution of crystallites 10 in glass composite 1 is stepped, with the spatial density of crystallites 10 decreasing at regular or irregular intervals from left to right. Although a somewhat regular distribution of crystallites 10 within intervals 12*a-h* is shown in FIG. 1A, it is to be recognized that the distribution within each interval may equivalently be at random. In FIG. 1B, the non-uniform distribution of crystallites 10 in glass composite 2 is at a continuously decreasing gradient from left to right. Although FIG. 1B has shown a continuously decreasing gradient in which the distribution of crystallites 10 is random on the whole, it is to be recognized that crystallites 10 can also be placed in an ordered fashion to provide a similar continuously decreasing gradient. In FIG. 1C, the spatial density of crystallites 10 is completely randomized in glass composite 3 and does not increase or decrease continuously. Although FIG. 1C has depicted a randomized distribution of crystallites 10 in glass composite 3, it is again to be recognized that a non-random distribution of crystallites 10 can still provide a global crystallite distribution similar to that depicted in FIG. 1C, which remains neither continuously increasing nor decreasing. The phase-separated region can also be substantially amorphous in alternative embodiments of the present disclosure. The effective refractive index can be determined by the relative volume fractions of each phase within the glass composites.

Although FIGS. 1A-1C have shown various exemplary two-dimensional distributions of crystallites 10 in amorphous phase 8, it is to be recognized that similar three-dimensional gradient distributions of crystallites 10 also fall within the scope of the present disclosure. Accordingly, in some embodiments, the glass composites of the present disclosure can have a gradient two-dimensional distribution of crystallites within the amorphous phase, and in other embodiments, the gradient distribution of crystallites can be extended into three dimensions. In addition, the size of the crystallites within the gradient distribution can vary as well, and the variation in size can be used to further tailor the properties of the glass composites. For example, the spacing, size, and refractive index of the crystallites can be chosen to minimize scattering or absorption of electromagnetic radiation, or other factors that can degrade optical quality. The morphology of the crystallites can be similarly varied.

In further regard to FIGS. 1A-1C, similar considerations also apply to instances in which a non-crystalline (i.e., amorphous) phase-separated region is present in a matrix of the amorphous phase. Hence, gradient distributions of any type of phase-separated region can be understood through reference to FIGS. 1A-1C, or any of the other FIGURES herein.

Figure 2:
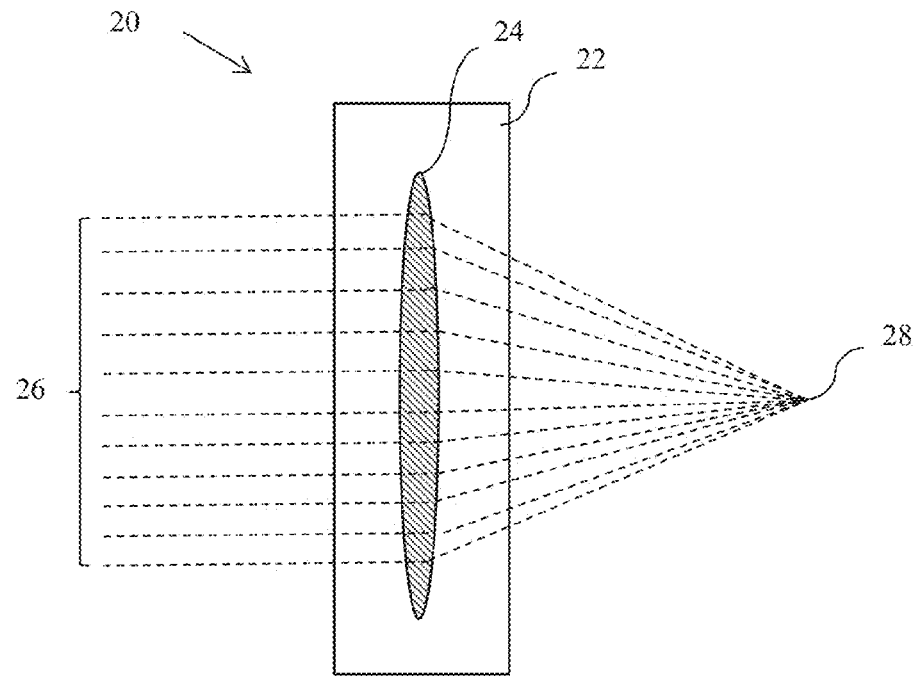
FIG. 2 shows a diagram of an illustrative lens formed from a glass composite having a gradient index of refraction.

In more specific embodiments, FIG. 2 shows a diagram of an illustrative lens formed from a glass composite having a gradient index of refraction. As shown in FIG. 2, lens 20 contains amorphous phase 22 and phase-separated region 24. Overall, the distribution of phase-separated region 24 is non-uniform within the glass composite. As further shown in FIG. 2, electromagnetic radiation 26 can interact with varying amounts of a material within phase-separated region 24 and undergo differential refraction depending upon the amount of material that is present at a given location. In the configuration shown in FIG. 2, electromagnetic radiation 26 is focused upon focal point 28; however, other types of optical configurations are also possible, and the lens configuration of FIG. 2 should not be considered limiting. It is similarly to be recognized that phase-separated region 24 does not necessarily represent a single type of material, and various distributions of materials can be present throughout this locale. For example, distributions similar to those of FIGS. 1A-1C can be present in phase-separated region 24. In addition, phase-separated region 24 can be crystalline or nanocrystalline in some embodiments. Furthermore, the shapes of phase-separated region 24 and lens 20 as a whole can be dictated by various operational considerations, and the illustrative lens configuration of FIG. 2 should not be considered limiting. Given the benefit of the present disclosure, one having ordinary skill in the art can determine an appropriate shape and distribution of phase-separated region 24 suitable for use in conjunction with a particular optical structure containing the glass composites described herein.

In some embodiments, the phase-separated regions can be crystalline and contain a plurality of crystallites. In some embodiments, the crystallites within the phase-separated region of the presently described glass composites can be in a nanocrystalline form. By maintaining the crystallites in a nanocrystalline form, scattering losses as electromagnetic radiation passes through the glass composites can be lessened or minimized. In some embodiments, the size of the crystallites can be limited to about one-tenth or less of the wavelengths of electromagnetic radiation passing through the glass composites. In more particular embodiments, the crystallite size can be limited to particle sizes ranging between about 1 nm and about 250 nm. Crystallite sizes within this nanocrystalline range can be especially effective for minimizing scattering of infrared and visible electromagnetic radiation, particularly within a wavelength range of about 1 micron to about 12 microns. As with the crystallite morphology in general, the morphology of crystallites in nanocrystalline form is not considered to be particularly limited. Illustrative nanocrystalline particulate morphologies can include, for example, substantially spherical, rod- or needle-shaped, platelet-shaped, or the like. In more particular embodiments, the glass composites of the present disclosure can include a plurality of PbSe crystallites in nanocrystalline form. In some embodiments, only PbSe can be present in the crystalline phase, and in other embodiments, PbSe can be co-crystallized with another substance.

In still other embodiments, PbSe can be present in the phase-separated region but not necessarily in crystalline form. In some embodiments, PbSe-enriched amorphous glasses can be present in the phase-separated region. Other crystalline materials can also be formed in the phase-separated regions of the various glass composites described herein.

In various embodiments, glass composites of the present disclosure can contain a phase-separated region having a refractive index that is greater than that of the amorphous phase. That is, in various embodiments, the second index of refraction is greater than that of the first index of refraction. In more particular embodiments, the first index of refraction and the second index of refraction can differ by a value of up to about 1. For example, in the case of a phase-separated region containing PbSe ($n_{PbSe}$~4), the difference in the refractive indices can be significant in the glass composites described herein. Ternary phases such as AsPbSe or GaPbSe can also be present in the phase-separated region.

In other various embodiments, the glass composites of the present disclosure can contain a phase-separated region having a refractive index that is less than that of the amorphous phase. Such glass composites can still function as a GRIN material if the refractive index difference is sufficiently great. Glass composites having a phase-separated region with a smaller refractive index than that of the amorphous phase can be obtained when the amount of PbZ is small.

The mixtures of components that can be used to form the glass composites of the present disclosure will now be described in more detail.

In more particular embodiments of the present disclosure, A is Ga or As, X is Cl, and Z is Se, or A is Ga, Sb or As, X is Cl, and Z is Se. Accordingly, in some embodiments of the present disclosure, glass composites can be formed from a mixture containing $GeSe_2$, $Ga_2Se_3$, and at least one of CsCl or PbSe. In other embodiments, the glass composites can be formed from a mixture containing $GeSe_2$, $As_2Se_3$, and at least one of CsCl or PbSe. In some embodiments, both CsCl and PbSe can be present, as described hereinafter. As described hereinabove, CsCl can be particularly advantageous in its effectiveness at extending the transmission window at longer wavelengths, and PbSe can be advantageous in its ability to maintain the transmission window while providing a large index of refraction compared to the other components of the mixture.

In more particular embodiments, the glass composites of the present disclosure can include $GeSe_2$ in a molar ratio of about 40% to about 60% and $Ga_2Se_3$ in a molar ratio of about 20% to about 30%. In various embodiments, the amorphous phase of the glass composites can be formed from at least the $GeSe_2$ and the $Ga_2Se_3$. That is, both $GaSe_2$ and $Ga_2Se_3$ are present. Crystallization within the phase-separated region can be particularly facile within the foregoing composition range.

In further embodiments, the glass composites of the present disclosure can include CsCl in a molar ratio of about 20% to about 30% and PbSe in a molar ratio of 0%. Suitable phase separation and even crystallite formation can still occur when this mixture of components is used.

In other further embodiments, the glass composites of the present disclosure can include CsCl in a molar ratio of 0% to about 10%, and PbSe in a molar ratio of about 5% or above. In some embodiments, the molar ratio of PbSe can range from about 5% to about 30%. In some embodiments, the molar ratio of CsCl can be nonzero.

In more particular embodiments, the glass composites of the present disclosure can include $GeSe_2$ in a molar ratio of about 20% to about 30% and $As_2Se_3$ in a molar ratio of about 65% to about 75%. In various embodiments, the amorphous phase of the glass composites can be formed from at least the $GeSe_2$ and the $As_2Se_3$. That is, both $GaSe_2$ and $As_2Se_3$ are present. In further embodiments, the mixture can contain PbSe in a molar ratio of about 5% to about 15%. In still further embodiments, a molar ratio of CsCl can be 0%.

As indicated above, the glass composites of the present disclosure can, in some embodiments, have a transmission window of at least about 1 micron to about 12 microns. Inclusion of CsCl or CsI in the glass composites, particularly CsCl in a molar ratio of at least about 5%, can be sufficient to extend the transmission window to 12 microns or beyond or to under 1 micron, compared to otherwise similar glass composites in which this salt is not present. CsCl, for example, can provide optical transparency down to a wavelength of about 100 nm. CsI can result in "blue shifting" of the transmission window.

In some instances, a transmission window of at least about 1 micron to about 12 microns can even be obtained when a cesium halide is not present. When an extended transmission window is not needed or desired, CsCl can be omitted from the mixtures used to form the glass composites of the present disclosure.

Suitable techniques for forming a phase-separated region within the glass composites of the present disclosure can include any technique capable of producing localized heating within an initially amorphous melt formed from the mixture used to produce the glass composite. In more particular embodiments, suitable techniques for producing localized heating can include spot heating of the initially amorphous melt with a laser. Illustrative techniques for inducing crystallization using a laser are described in more detail hereinafter. In particular, FIG. 3, which is discussed in further detail hereinbelow, shows a diagram of an illustrative laser assembly which can be used to produce a non-uniform distribution of a phase-separated region within an amorphous phase.

Without being bound by any theory or mechanism, it is believed that localized heating of an amorphous phase through focused introduction of energy thereto can result in localized phase separation, sometimes with transformation of at least some of the material therein into crystallization nuclei, from which crystallite growth can subsequently proceed. The crystallization nuclei can be formed from the same substance that subsequently crystallizes around it, or they can contain a different material entirely. Alternately, crystallization nuclei can promote expansion of a phase-separated region that has a non-crystalline morphology. In either case, because the phase-separated region has a different composition than the surrounding amorphous phase from which it was produced, the amorphous phase and the phase-separated region can have differing indices of refraction, even though the overall makeup of the composite remains substantially unchanged following phase separation. By varying the spatial positioning of the localized heating (in two- or three-dimensions), a gradient distribution of the phase-separated region can be realized in the amorphous phase, thereby leading to a glass composite having a gradient index of refraction.

Any suitable energy source can be used to affect localized heating in the course of forming the phase-separated region of the presently described glass composites. Suitable energy sources can include, for example, radiant heat, microwave radiation sources, vibrational sources, ionizing radiation sources, electromagnetic radiation sources, or any combination thereof. In more particular embodiments, localized heating can be affected using a laser. Lasers can be particularly advantageous in this regard due to their highly coherent output of electromagnetic radiation and narrow beam width. Hence, by appropriately positioning a laser upon a mixture of components described hereinabove, a phase-separated region can be accurately formed at a desired location or locations and at a desired size. Similarly, a laser of an appropriate wavelength can be chosen such that a given material within the glass composites selectively absorbs the electromagnetic radiation and undergoes heating as a result. This can further aid the localized heating process. In some embodiments, a component can be added to the mixture that has a specific absorption for the laser wavelength used to affect localized heating.

Laser-induced formation of a phase-separated region within the glass composites of the present disclosure can take place in various manners. In each case, formation of the phase-separated region begins with an initially homogenous glass composition constituting an intermediate amorphous phase. Thereafter, laser heating can take place to form the phase-separated regions in various desired locations within an amorphous phase. In some embodiments, laser heating can be used to form an initial amount of the phase-separated region in various desired locations, and a homogenous thermal treatment can then follow to expand the size of the phase-separated region. In some embodiments, a homogenous thermal treatment can be used to create a plurality of nucleation sites in the intermediate amorphous phase, and laser heating can then be used to expand the size of the phase-separated region. In still other embodiments, laser irradiation can be conducted at an elevated temperature to simultaneously form nucleation sites in the intermediate amorphous phase and to expand the size of the phase-separated region at the locations of laser irradiation. Crystallization can occur within the phase-separated region in some instances upon performing laser irradiation.

Figure 3:
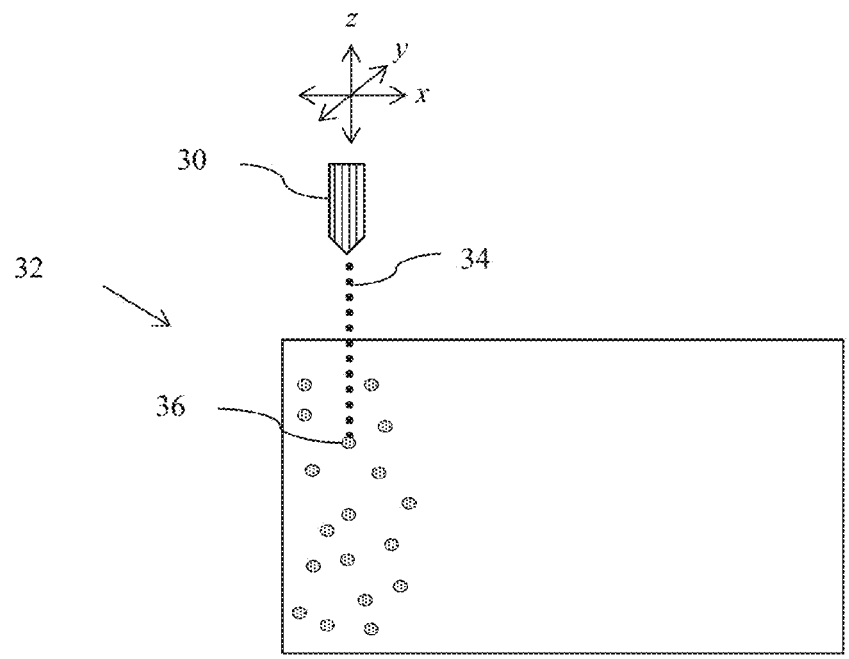
FIG. 3 shows a diagram of an illustrative laser assembly which can be used to produce a non-uniform distribution of a phase-separated region within an amorphous phase.

As shown in FIG. 3, laser 30 can be translated in the x, y and z dimensions to adjust the lateral positioning and focal length or penetration depth of laser beam 34 upon glass composite 32. Hence, laser beam 34 can be utilized to affect localized heating of glass composite 32 to produce phase-separated region 36 at any desired position in three-dimensional space. Even without varying the focal length and penetration depth of laser beam 34, a randomized two-dimensional distribution of phase-separated region 36 can be obtained. Additional locations of phase-separated region 36 that were previously formed in glass composite 32 are also shown in FIG. 3. Suitable mechanisms and operating software (e.g., computer-controlled robotics) for translating laser 30 will be familiar to one having ordinary skill in the art. As discussed above, laser 30 can be tuned or chosen to be consistent with a wavelength of electromagnetic radiation absorbed by at least one component of the glass composite in order to affect localized heating. Similarly, the beam width can be varied to alter the size of phase-separated region 36 that is formed. In alternative embodiments, an electron beam can be substituted for laser 30 in order to affect localized heating within glass composite 30.

Accordingly, in some embodiments, methods of the present disclosure can include: providing a mixture containing $GeZ_2$ and $A_2Z_3$ in a combined molar ratio of about 60% to about 95%, and CsX and PbZ in a combined molar ratio of about 5% to about 40%; heating the mixture to form a melt; cooling the melt below a glass transition temperature thereof to form an intermediate amorphous material; and locally heating the intermediate amorphous material to define a phase-separated region within an amorphous phase. A is As, Sb or Ga, X is Cl or I, and Z is S or Se. The mixture contains PbZ in a molar ratio of about 15% or less when A is As. The phase-separated region is disposed non-uniformly within the amorphous phase. The amorphous phase has a first index of refraction, and the phase-separated region has a second index of refraction, where the first index of refraction differs from the second index of refraction. In some embodiments, locally heating the intermediate amorphous material can include spot heating a plurality of locations in the intermediate amorphous phase with a laser. In some embodiments, the cooling can take place at a controlled cooling rate to induce formation of the intermediate amorphous material.

In various embodiments, the melt can be shaped into various forms before being cooled below the glass transition temperature. Illustrative forms can include for example, a rod, slab, fiber, preform, or a near net shape lens that is subsequently further processed. In other embodiments, the melt can be layered upon an optical substrate that can be the same or different than the material within the amorphous phase. The chosen form can be dependent upon the type of optical structure into which the glass composite is ultimately to be incorporated. Compatibility with subsequent optical fabrication methodologies may also be considered.

EXAMPLES

Example 1

Amorphous base glass blends were prepared by combining the molar ratios of components set forth in Table 2 and forming a melt. Upon cooling, various properties of the amorphous base glass blends were measured and are summarized in Table 3. Data for CLEARTRAN glass is also provided in Table 3 for comparative purposes. Transmission measurements were generally carried out on 2 mm thick samples obtained from 30 gram melts. Refractive indices were measured at 4.5 microns at a temperature of 30° C. Differential scanning calorimetry measurements for glass transition temperature ($T_g$) measurements and crystallization temperature ($T_x$) measurements were carried out at a rate of 10° C./min. Thermal expansion measurements were carried out at a rate of 3° C./min over a temperature range of 50-200° C. Microhardness measurements were determined in the presence of a 100 mN applied force, except as otherwise specified in Table 3.

TABLE 2

| Glass Blend | GeSe | $Ga_2Se_3$ | PbSe | CsX |
|---|---|---|---|---|
| 1 | 80 | 20 | — | — |
| 2 | 72 | 18 | — | 10 (X = I) |
| 3 | 60.3 | 29.7 | — | 10 (X = Cl) |
| 4 | 54 | 27 | 10 | 10 (X = Cl) |

TABLE 3

| Glass Blend | Window (microns) | N | dn/dT ($\times 10^{-6}$ $C^{-1}$) | $T_g$ (° C.) | $T_x$ (° C.) | Upper Use (° C.) | Thermal Expansion (ppm/° C.) | Density (g/cm$^3$) | Microhardness (GPa) |
|---|---|---|---|---|---|---|---|---|---|
| CLEARTRAN | 0.37-14 | 2.25 | 38.7 | — | — | 200 | 7-7.75 | 4.09 | 1.47 |
| 1 | 0.73-11.5 | 2.37 | 71.71 | 351 | 460 | 311 | 13.7 | 4.42 | 1.73 [50 mN] |
| 2 | 0.7-15 | 2.28 | 30.40 | 361 | 460 | 321 | 17.17 | 4.38 | 1.58 |
| 3 | 0.7-12 | — | — | 364 | 430 | 324 | 15.96 | 4.3 | 1.82 |
| 4 | 0.74-12 | 2.36 | — | 352 | 435 | 330 | 16.5 | 4.57 | 1.90 [75 mN] |

Following preparation of the base (wholly amorphous) glass blends, crystallization was subsequently induced by reheating, as described hereinafter. In some instances, localized heating was conducted using a laser (see below).

Figure 4:
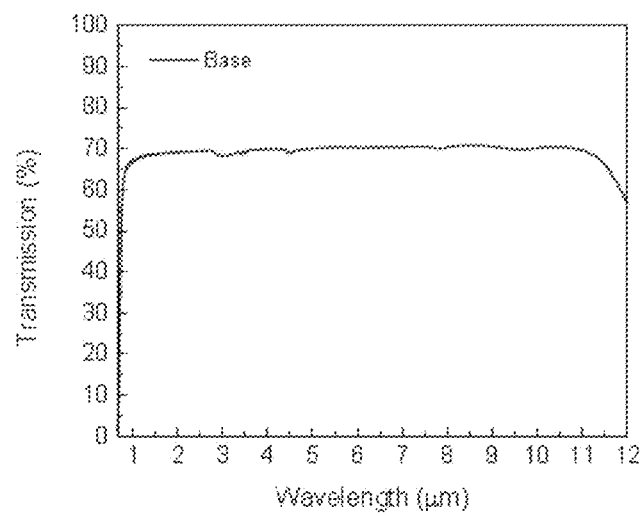
FIGS. 4 and 5 show illustrative plots of the transmission window of 80 $GeSe_2$-20 $Ga_2Se_3$ base glass (Glass Blend 1)
Figure 5:
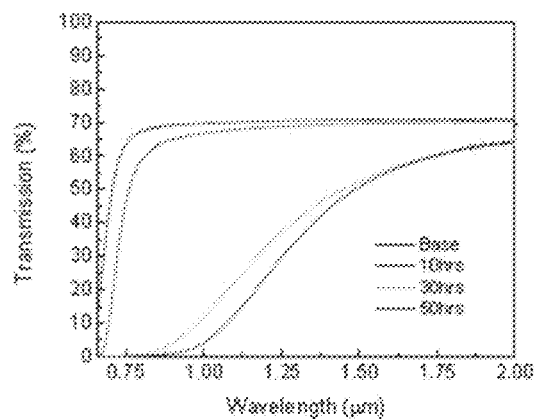

FIGS. 4 and 5 show illustrative plots of the transmission window of 80 $GeSe_2$-20 $Ga_2Se_3$ base glass (Glass Blend 1). Upon uniform reheating at 380° C. for various lengths of time, nanocrystals formed in irregular clusters. The effective crystal diameter was 5-10 nm after 10 hours of heating, and after 50 hours of heating, some crystals were greater than 50 nm in effective diameter. The crystal filling fraction, f, was 1-3% at 10 hours of heating, and it increased to approximately 20% at 50 hours of heating. The x-ray diffraction pattern was consistent with $Ga_2Se_3$ crystal formation. Table 4 shows the properties of Glass Blend 1 following crystallization. Table 5 shows the change in refractive index of Glass Blend 1 following crystallization, which is indicative of this material's potential ability to function as a GRIN material upon inducing a non-uniform disposition of the crystallites therein. Since the nanocrystal formation occurred under uniform heating conditions in this case, a GRIN material was not formed due to a gradient nanocrystal distribution not being established.

TABLE 4

| Glass Blend 1 | Window (microns) | n | dn/dT ($\times 10^{-6}$ $C^{-1}$) | $T_g$ (° C.) | $T_x$ (° C.) | Upper Use (° C.) | Thermal Expansion (ppm/° C.) | Density (g/cm³) | Microhardness (GPa) |
|---|---|---|---|---|---|---|---|---|---|
| Base Glass | 0.73-11.5 | 2.37 | — | 351 | 460 | 311 | 13.7 | 4.42 | 1.73 [50 mN] |
| 10 hr reheating | 0.8-11.5 | 2.38 | 82.10 | 375 | 428 | 311 | 13.6 | 4.45 | 1.73 [50 mN] |
| 30 hr reheating | 1.75-11.5 | 2.39 | 71.92 | 400 | 454 | 311 | 14.5 | 4.46 | 1.99 |
| 50 hr reheating | 1.75-11.5 | 2.40 | — | — | — | 311 | — | 4.57 | 1.52 |

TABLE 5

| Glass Blend 1 | Refractive Index Change Relative to Base Glass |
|---|---|
| 10 hr reheating | 0.000126 |
| 30 hr reheating | 0.0194 |
| 50 hr reheating | 0.029 |

In addition to the desirable attribute of this glass blend showing a refractive index change upon undergoing crystallization, it also had a good upper use temperature and a microhardness value exceeding that of ZnS. As shown in Table 4 and FIG. 5, however, the base glass initially had a wide transmission window, but the transmission window considerably narrowed as the extent of crystallization increased upon extended heating.

Figure 6:
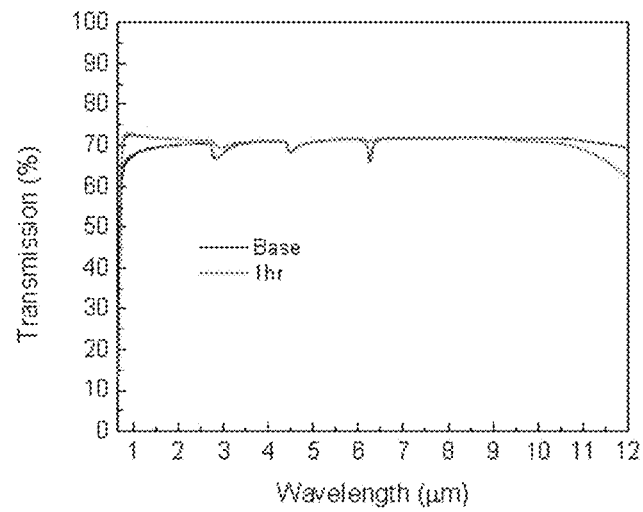
FIG. 6 shows an illustrative plot of the transmission windows of 72 $GeSe_2$-18 $Ga_2Se_3$-10 CsCl base glass (Glass Blend 2) and that obtained following crystallization under uniform heating conditions.

FIG. 6 shows an illustrative plot of the transmission windows of 72 $GeSe_2$-18 $Ga_2Se_3$-10 CsCl base glass (Glass Blend 2) and that obtained following crystallization under uniform heating conditions. Upon reheating at 400° C. for 1 hour, large crystals (>50 nm in size) formed throughout with a crystal filling factor, f, of approximately 70%. The negligible scattering in the transmission spectrum suggests a marginal differing in refractive indices between the amorphous phase and the crystalline phase. Indeed, the measured difference in refractive index between the base glass and that of the crystallized material was only −0.00246 in this case. Table 6 summarizes the properties of Glass Blend 2 before and after crystallization.

TABLE 6

| Glass Blend 2 | Window (microns) | n | dn/dT ($\times 10^{-6}$ $C^{-1}$) | $T_g$ (° C.) | $T_x$ (° C.) | Upper Use (° C.) | Thermal Expansion (ppm/° C.) | Density (g/cm³) | Microhardness (GPa) |
|---|---|---|---|---|---|---|---|---|---|
| Base Glass | 0.7-15 | 2.28 | 30.40 | 361 | 472 | 321 | 17.17 | 4.38 | 1.58 |
| 1 hr reheating | 0.-12 | 2.2 | 37.13 | 362 | 466 | 321 | 17.41 | 4.32 | 1.53 |

Like Glass Blend 1, Glass Blend 2 also had a good upper use temperature and a microhardness value exceeding that of ZnS. However, the negligible change in refractive index upon undergoing crystallization makes this glass blend a generally poor choice for development as a GRIN material, particularly under the uniform heating conditions that were employed.

Figure 7:
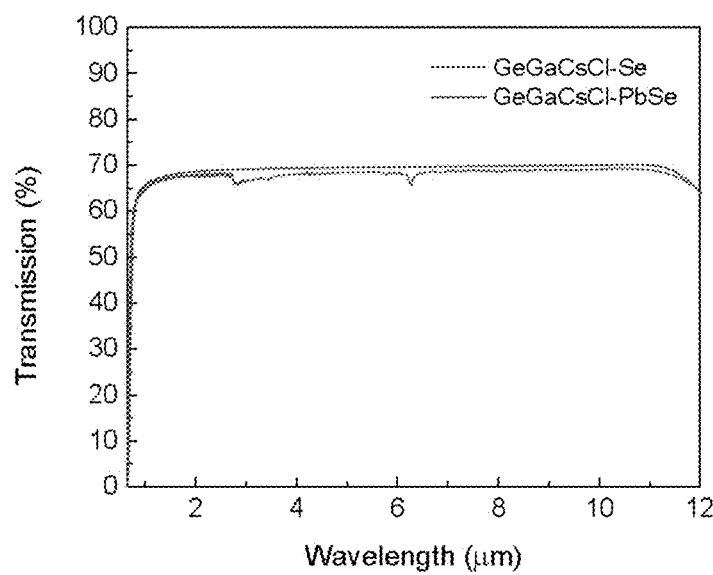
FIG. 7 shows an illustrative plot of the transmission windows of 60.3 $GeSe_2$-29.7 $Ga_2Se_3$-10 CsCl base glass (Glass Blend 3) and 54 $GeSe_2$-27 $Ga_2Se_3$-10 CsCl-10 PbSe base glass (Glass Blend 4)

FIG. 7 shows an illustrative plot of the transmission windows of 60.3 $GeSe_2$-29.7 $Ga_2Se_3$-10 CsCl base glass (Glass Blend 3) and 54 $GeSe_2$-27 $Ga_2Se_3$-10 CsCl-10 PbSe base glass (Glass Blend 4). As shown in FIG. 7, the inclusion of PbSe in the base glass did not appreciably alter the transmission window. Upon uniform reheating at 290° C. for 30 minutes, some phase separation occurred, but no crystallization. The phase-separated regions were approximately 5 nm in diameter. Upon uniform reheating at 420° C. for one hour, nearly the entire sample became crystalline, and at least two different crystal morphologies were present. However, at this temperature the transmission window of the base glass was lost. Upon lowering the uniform reheating temperature to 400° C. and reheating for a comparable length of time, the transmission window was maintained. Table 7 summarizes the properties of Glass Blend 4 before and after crystallization. Table 8 shows the change in refractive index of Glass Blend 4 following crystallization at various temperatures, which is indicative of this material's potential ability to function as a GRIN material upon inducing a non-uniform disposition crystallites therein. Although total crystallization under uniform heating at 420° C. reduced the optical transparency of Glass Blend 4, partial crystallization via laser-induced heating can result in the optical transparency being maintained while still providing a large difference in refractive index.

TABLE 7

| Glass Composition 4 | Window (microns) | n | dn/dT (×10⁻⁶ C⁻¹) | $T_g$ (° C.) | $T_x$ (° C.) | Upper Use (° C.) | Thermal Expansion (ppm/° C.) | Density (g/cm³) | Microhardness (GPa) |
|---|---|---|---|---|---|---|---|---|---|
| Base Glass | 0.74-12 | 2.35 | — | 352 | 435 | 312 | 16.5 | 4.57 | 1.90 ]75 mN] |
| 400° C. reheating | 0.76-12 | 2.34 | — | 351 | 431 | 312 | 16.44 | 4.61 | 2.02 [75 mN] |
| 420° C. | none | 2.39 | — | 353 | 423 | 312 | — | — | — |

TABLE 8

| Glass Blend 4 | Refractive Index Change Relative to Base Glass |
|---|---|
| 400° C. reheating | −0.0093 |
| 420° C. reheating | 0.0406 |

Figure 8:
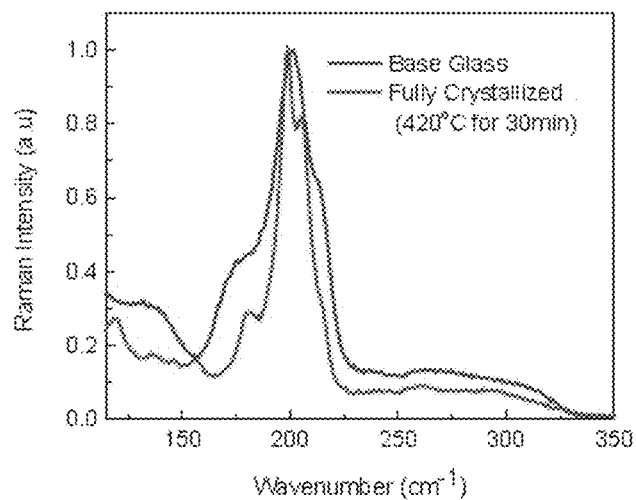
FIG. 8 shows a plot of illustrative Raman spectra for 54 $GeSe_2$-27 $Ga_2Se_3$-10 CsCl-10 PbSe base glass (Glass Blend 4) and that obtained following crystallization at 420° C. under uniform heating conditions.
Figure 9:
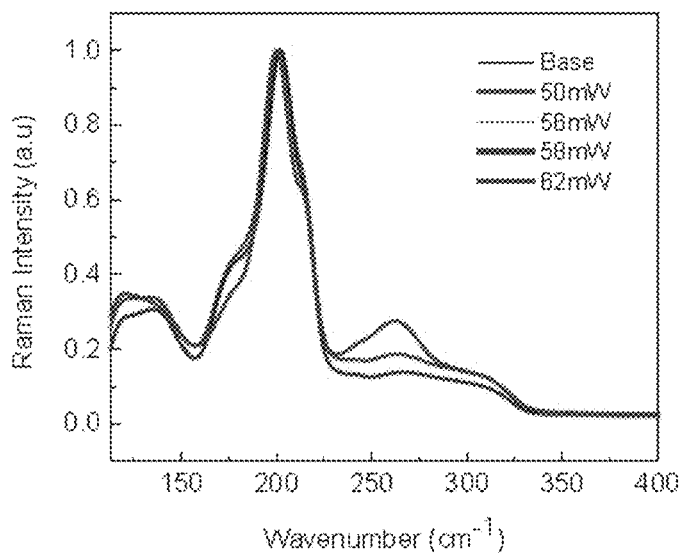
FIG. 9 shows a plot of illustrative Raman spectra for 54 $GeSe_2$-27 $Ga_2Se_3$-10 CsCl-10 PbSe base glass (Glass Blend 4) following crystallization under non-uniform heating conditions at various laser powers.

FIG. 8 shows a plot of illustrative Raman spectra for 54 GeSe₂-27 Ga₂Se₃-10 CsCl-10 PbSe base glass (Glass Blend 4) and that obtained following crystallization at 420° C. under uniform heating conditions. As shown in FIG. 8, the crystallized material had narrower and more defined peak shapes than did the base glass. FIG. 9 shows a plot of illustrative Raman spectra for 54 GeSe₂-27 Ga₂Se₃-10 CsCl-10 PbSe base glass (Glass Blend 4) following crystallization under non-uniform heating conditions at various laser powers. As shown in FIG. 9, the comparable changes in the Raman spectrum were obtained in the locations where localized laser heating was conducted. Hence, by inducing a non-uniform distribution of crystallites in Glass Blend 4 through localized laser heating, a GRIN material can be obtained.

Example 2

Various glass blends were formulated as set forth in Table 9 and were processed by melt blending. Each of the glass blends showed some degree of phase separation following uniform reheating and cooling below the glass transition temperature. Glass Blends H-N further showed at least some degree of crystallization following uniform reheating and cooling below the glass transition temperature.

TABLE 9

| Glass Blend | Composition |
|---|---|
| A | 65GeS₂—25Ga₂S₃—10CsCl |
| B | 62.5GeS₂—12.5Ga₂S₃—25CsCl |
| C | 5Ga—10Sb—25Ge—60Se |
| D | 30Ge—10Ga—60Se |
| E | 23Ge—12Ga—65Se |
| F | 72GeSe₂—18Ga₂Se₃—10CsCl |
| G | 60GeSe₂—30Ga₂Se₃—10CsCl |
| H | 60GeSe₂—20Ga₂Se₃—20CsCl |
| I | 45GeSe₂—25Ga₂Se₃—30CsCl |
| J | 23.6GeSe₂—67.6As₂Se₃—5CsCl—4.8PbSe |
| K | 60GeSe₂—30Ga₂Se₃—10PbSe |
| L | 54.6GeSe₂—27.6Ga₂Se₃—9CsCl—10PbSe |
| M | 48GeSe₂—24Ga₂Se₃—8CsCl—20PbSe |
| N | 42GeSe₂—21Ga₂Se₃—7CsCl—30PbSe |
| O | 23.75GeSe₂—71.25As₂Se₃—5PbSe |
| P | 23GeSe₂—69As₂Se₃—8PbSe |
| Q | 14Ge—12Sb—60Se—14Pb |

Figure 10:
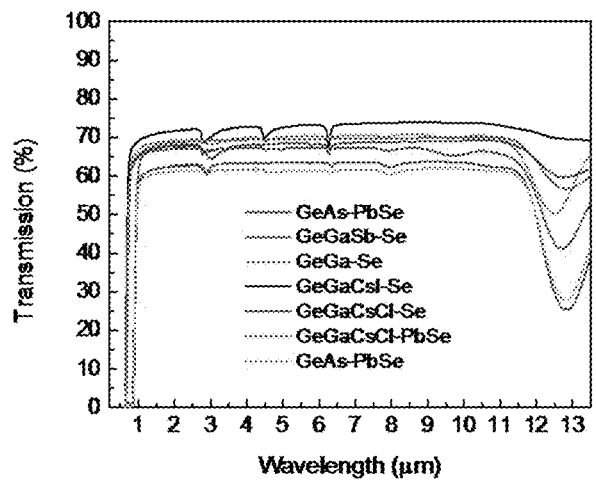
FIG. 10 shows an illustrative plot of the transmission window for various Glass Blends from Table 9.

FIG. 10 shows an illustrative plot of the transmission window for various Glass Blends from Table 9.

Figure 11:
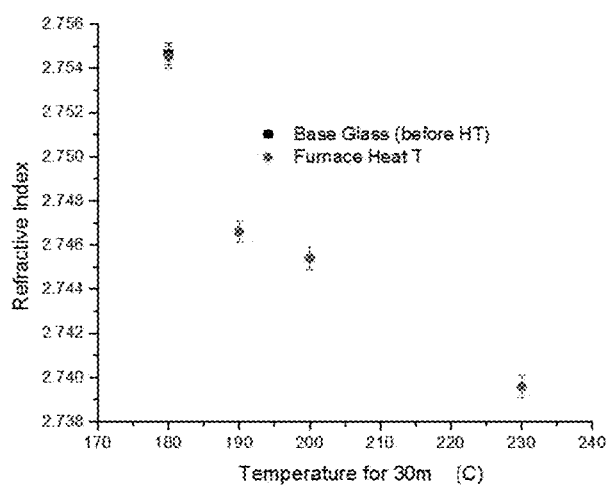
FIG. 11 shows an illustrative plot of the change in refractive index for Glass Blend P following uniform reheating at various temperatures for 30 minutes.

FIG. 11 shows an illustrative plot of the change in refractive index for Glass Blend P following uniform reheating at various temperatures for 30 minutes. As shown in FIG. 11, the refractive index dropped as a function of time under uniform reheating conditions in a furnace. Below about 180° C., the change in refractive index was negligible.

Figure 12:
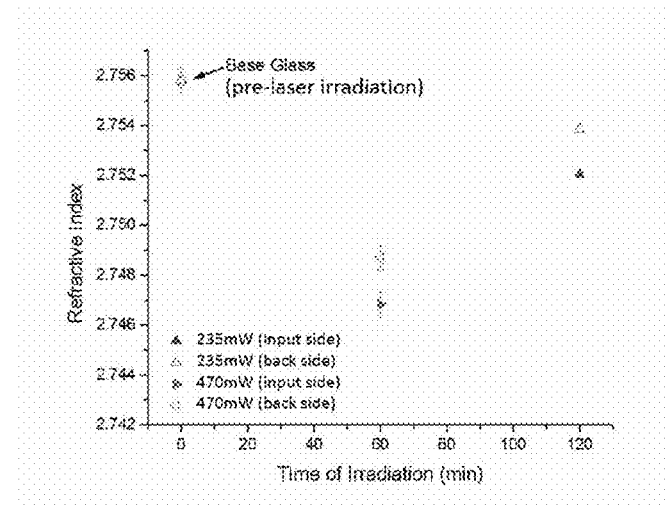
FIG. 12 shows an illustrative plot of the change in refractive index for Glass Blend P following spot heating with a laser under various conditions.

Laser reheating also produced a decrease in refractive index. FIG. 12 shows an illustrative plot of the change in refractive index for Glass Blend P following spot heating with a laser under various conditions. The base glass was heated at 177° C. (conditions which did not affect a substantial refractive index change), and localized laser heating took place for various lengths of time. The refractive index again dropped in the location where laser heating took place.

Figure 13A:
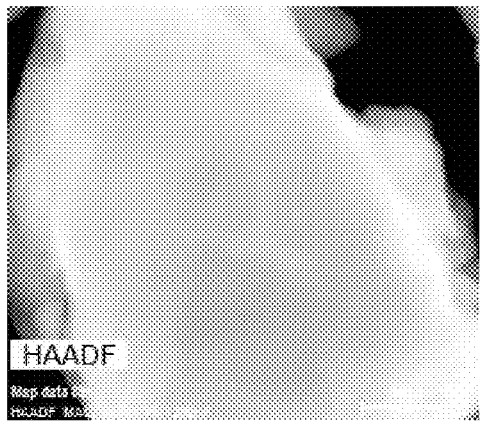
FIGS. 13A-13C show illustrative TEM images of Glass Blend P before and after laser reheating.
Figure 13B:
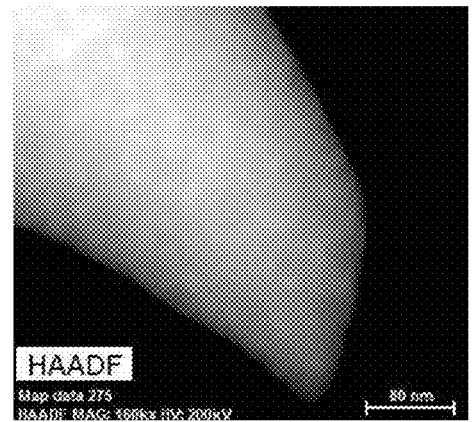
Figure 13C:
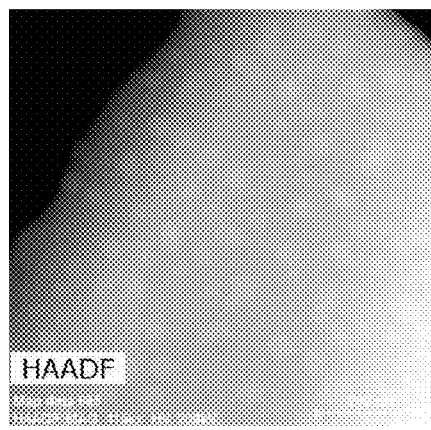
Figure 14A:
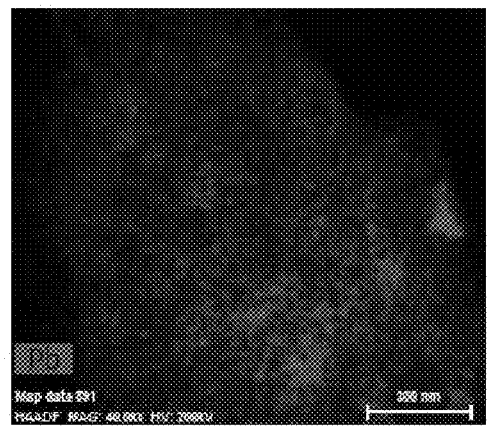
FIGS. 14A-14C show illustrative)(EDS maps before and after laser irradiation and reheating.
Figure 14B:
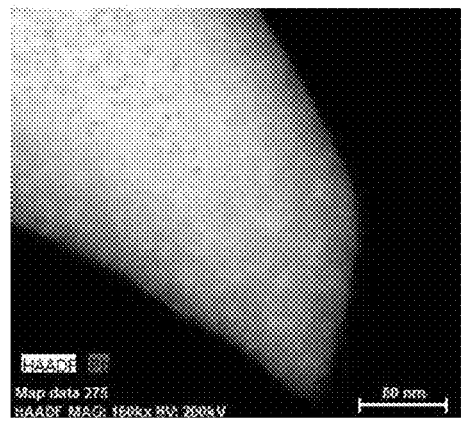
Figure 14C:
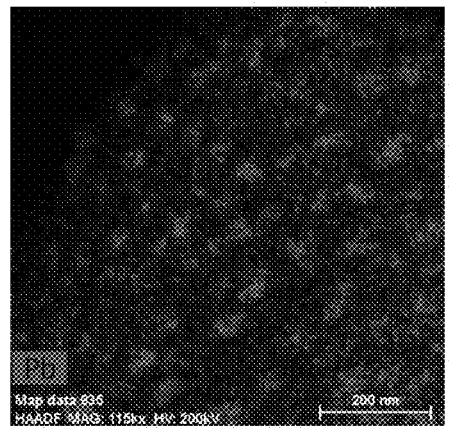

FIGS. 13A-13C show illustrative TEM images of Glass Blend P before and after laser reheating. Before laser reheating, Glass Blend P was amorphous and fully homogenous (see FIG. 13A). After laser heating, phase-separated regions approximately 5 nm in size were formed (see FIG. 13B). The phase-separated regions were enriched in lead. After further heating took place, the phase-separated regions further increased in size to approximately 35 nm. Correspondingly, FIGS. 14A-14C show illustrative XEDS maps before and after laser irradiation and reheating.

Although the disclosure has been described with reference to the above embodiments, one of ordinary skill in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A glass composite having a gradient index of refraction, comprising:
    an amorphous phase; and
    a phase-separated region disposed non-uniformly within the amorphous phase;
        wherein the amorphous phase has a first index of refraction, and the phase-separated region has a second index of refraction, the first index of refraction differing from the second index of refraction; and
    wherein the glass composite comprises a mixture comprising:
        GeZ₂ and A₂Z₃ in a combined molar ratio of about 60% to about 95%, and
        CsX and PbZ in a combined molar ratio of about 5% to about 40%;
            wherein A is As, Sb or Ga, X is Cl, Br or I, and Z is S or Se; and
            wherein the glass composite comprises PbZ in a molar ratio of about 15% or less when A is As.

2. The glass composite of claim 1, wherein A is Ga or As, X is Cl, and Z is Se.

3. The glass composite of claim 2, wherein the mixture comprises:
GeSe$_2$ in a molar ratio of about 20% to about 30%, and As$_2$Se$_3$ in a molar ratio of about 65% to about 75%.

4. The glass composite of claim 3, wherein the mixture comprises PbSe in a molar ratio of about 5% to about 15%.

5. The glass composite of claim 4, wherein a molar ratio of CsCl is 0%.

6. The glass composite of claim 2, wherein the mixture comprises:
GeSe$_2$ in a molar ratio of about 40% to about 60%, and Ga$_2$Se$_3$ in a molar ratio of about 20% to about 30%.

7. The glass composite of claim 6, wherein the mixture comprises:
CsCl in a molar ratio of about 20% to about 30%, and a molar ratio of PbSe is 0.

8. The glass composite of claim 6, wherein the mixture comprises:
CsCl in a molar ratio of about 0% to about 10%, and PbSe in a molar ratio of about 5% or above.

9. The glass composite of claim 8, wherein the molar ratio of PbSe is about 5% to about 30%.

10. The glass composite of claim 8, wherein the PbSe comprises a plurality of crystallites in the phase-separated region.

11. The glass composite of claim 10, wherein the PbSe is present in a nanocrystalline form.

12. The glass composite of claim 1, wherein the glass composite has a transmission window of at least about 1 micron to about 12 microns.

13. The glass composite of claim 1, wherein the first index of refraction and the second index of refraction differ by a value of up to about 1.

14. An optical structure comprising the glass composite of claim 1.

15. The optical structure of claim 14, wherein the glass composite defines a lens.

16. A method comprising:
providing a mixture comprising:
GeZ$_2$ and A$_2$Z$_3$ in a combined molar ratio of about 60% to about 95%, and
CsX and PbZ in a combined molar ratio of about 5% to about 40%;
wherein A is As, Sb or Ga, X is Cl, Br or I, and Z is S or Se; and
wherein the mixture comprises PbZ in a molar ratio of about 15% or less when A is As;
heating the mixture to form a melt;
cooling the melt below a glass transition temperature thereof to form an intermediate amorphous material; and
locally heating the intermediate amorphous material to define a phase-separated region within an amorphous phase;
wherein the amorphous phase has a first index of refraction, and the phase-separated region has a second index of refraction, the first index of refraction differing from the second index of refraction; and
wherein the phase-separated region is disposed non-uniformly within the amorphous phase.

17. The method of claim 16, wherein the mixture comprise:
GeSe$_2$ in a molar ratio of about 20% to about 30%, and As$_2$Se$_3$ in a molar ratio of about 65% to about 75%.

18. The method of claim 17, wherein the mixture comprises PbSe in a molar ratio of about 5% to about 15%.

19. The method of claim 17, wherein a molar ratio of CsCl is 0%.

20. The method of claim 16, wherein A is Ga or As, X is Cl, and Z is Se.

21. The method of claim 20, wherein the mixture comprises:
GeSe$_2$ in a molar ratio of about 40% to about 60%, and Ga$_2$Se$_3$ in a molar ratio of about 20% to about 30%.

22. The method of claim 21, wherein the mixture comprises:
CsCl in a molar ratio of 0% to about 10%, and PbSe in a molar ratio of about 5% or above.

23. The method of claim 21, wherein the mixture comprises:
CsCl in a molar ratio of about 20% to about 30%, and a molar ratio of PbSe is 0.

24. The method of claim 16, wherein locally heating the intermediate amorphous material comprises spot heating of a plurality of locations in the intermediate amorphous material with a laser.

* * * * *